(12) United States Patent
Chang et al.

(10) Patent No.: US 9,503,626 B2
(45) Date of Patent: Nov. 22, 2016

(54) IMAGE DISPLAY APPARATUS, CAMERA AND CONTROL METHOD OF THE SAME

(75) Inventors: Woo-yong Chang, Gyeonggi-do (KR); Seung-dong Yu, Gyeonggi-do (KR); Se-jun Park, Gyeonggi-do (KR); Min-jeong Moon, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 219 days.

(21) Appl. No.: 12/943,680

(22) Filed: Nov. 10, 2010

(65) Prior Publication Data
US 2011/0109751 A1    May 12, 2011

(30) Foreign Application Priority Data

Nov. 12, 2009   (KR) .................. 10-2009-0109336

(51) Int. Cl.
| | |
|---|---|
| H04N 5/225 | (2006.01) |
| H04N 5/262 | (2006.01) |
| H04N 5/222 | (2006.01) |
| H04N 5/232 | (2006.01) |
| H04N 7/18 | (2006.01) |
| H04N 21/436 | (2011.01) |

(52) U.S. Cl.
CPC ...... *H04N 5/23203* (2013.01); *H04N 5/23206* (2013.01); *H04N 7/181* (2013.01); *H04N 21/43615* (2013.01)

(58) Field of Classification Search
CPC .................... H04N 5/23203; H04N 5/23206; H04N 7/181
USPC ............ 348/14.02–14.03, 14.05, 207.1, 240, 348/333.01, 333.02, 333.05
See application file for complete search history.

(56) References Cited

U.S. PATENT DOCUMENTS

| | | | | |
|---|---|---|---|---|
| 6,738,075 B1* | 5/2004 | Torres | .................. | G11B 27/034 348/333.05 |
| 6,973,200 B1* | 12/2005 | Tanaka | ............... | H04N 5/23203 348/169 |
| 7,440,594 B2* | 10/2008 | Takenaka | ....................... | 382/118 |
| 7,907,180 B2* | 3/2011 | Takayama | .................. | 348/211.8 |
| 8,026,945 B2* | 9/2011 | Garoutte et al. | ............. | 348/143 |
| 2003/0025802 A1* | 2/2003 | Mayer, Jr. | ................ | G03B 7/12 348/211.99 |
| 2003/0110634 A1* | 6/2003 | Joyner | ................... | B25B 27/06 29/898.07 |

(Continued)

FOREIGN PATENT DOCUMENTS

| | | |
|---|---|---|
| CN | 1503558 | 6/2004 |
| CN | 101119479 | 2/2008 |

(Continued)

OTHER PUBLICATIONS

Chinese Office Action dated Jul. 27, 2015 issued in counterpart application No. 201080051375.0, 20 pages.

(Continued)

*Primary Examiner* — Trung Diep
(74) *Attorney, Agent, or Firm* — The Farrell Law Firm, P.C.

(57) ABSTRACT

Disclosed are an image display apparatus, a camera and a control method of the same for photographing various images in a natural manner, the image display apparatus including a display unit, a user input receiver, a communication unit which communicates with at least one camera through a network, and a controller which displays an image input by the camera, and transmits a photographing signal to the camera according to the user's input.

34 Claims, 11 Drawing Sheets

(56) References Cited

U.S. PATENT DOCUMENTS

| | | |
|---|---|---|
| 2004/0105450 A1 | 6/2004 | Ikuta et al. |
| 2004/0239776 A1* | 12/2004 | Shinohara et al. ........... 348/239 |
| 2005/0110634 A1* | 5/2005 | Salcedo ........... G08B 13/19673 340/539.1 |
| 2006/0064732 A1 | 3/2006 | Hirosawa et al. |
| 2006/0092269 A1* | 5/2006 | Baird et al. ................ 348/14.08 |
| 2008/0106597 A1* | 5/2008 | Amini et al. .................. 348/143 |
| 2008/0118157 A1 | 5/2008 | Takayama |
| 2008/0122949 A1 | 5/2008 | Kindborg et al. |
| 2008/0166966 A1* | 7/2008 | Hamasaki et al. ........... 455/41.2 |
| 2009/0115852 A1* | 5/2009 | Jung .................. H04N 1/00137 348/207.1 |
| 2009/0138542 A1 | 5/2009 | Sakai et al. |
| 2009/0141180 A1 | 6/2009 | Kondo et al. |
| 2009/0147100 A1 | 6/2009 | Nagamasa et al. |

FOREIGN PATENT DOCUMENTS

| | | |
|---|---|---|
| EP | 1 876 828 | 1/2008 |
| JP | 2007-279144 | 10/2007 |
| JP | 2008-16930 | 1/2008 |
| JP | 2008-141537 | 6/2008 |
| JP | 2009-135726 | 6/2009 |
| JP | 2009-146384 | 7/2009 |
| JP | 2009-200788 | 9/2009 |

OTHER PUBLICATIONS

Korean Office Action dated Sep. 10, 2015 issued in counterpart application No. 10-2009-0109336, 10 pages.

European Search Report dated Mar. 18, 2015 issued in counterpart application No. 10830134.2-1905.

Korean Office Action dated Mar. 21, 2016 issued in counterpart application No. 10-2009-0109336, 7 pages.

Chinese Office Action dated Feb. 6, 2016 issued in counterpart application No. 201080051375.0, 20 pages.

Korean Office Action dated Sep. 26, 2016 issued in counterpart application No. 10-2009-0109336, 7 pages.

* cited by examiner

FIG. 11

IMAGE DISPLAY APPARATUS, CAMERA AND CONTROL METHOD OF THE SAME

PRIORITY

This application claims priority under 35 U.S.C. 119 to Korean Patent Application No. 10-2009-0109336, which was filed in the Korean Intellectual Property Office on Nov. 12, 2009, the contents of which are incorporated herein by reference.

BACKGROUND OF THE INVENTION

1. Field of the Invention

The present invention relates generally to an image display apparatus, and more particularly, to an image display apparatus, a camera and a control method of the same, which displays a photographed image.

2. Description of the Related Art

In recent times, it has become increasingly popular to exchange audio/video contents such as music or video it has become common to not only view TV programs or listen to music on the Internet at home, but also to exchange Audio/Video (AV) contents through a network. Accordingly, a home networking by which various AV devices are connected for a user to enjoy AV contents without difficulty has been realized.

To do so, a user not only needs electric appliances connected to a Local Area Network (LAN) interface or to have a wireless LAN installed, but also needs various mechanisms to recognize the existence of others through a network, search for contents, and set content exchange. Various middleware applications such as Universal Plug and Play (UPnP) are used to recognize the existence of others, search for contents and exchange desired contents through a network.

As another example of such middleware, Digital Living Network Alliance (DLNA) focuses on sharing all of contents provided by such devices as Television (TV), VCR, digital cameras and audio systems. Also, the DLNA supports a user to acquire, transmit and manage a number of digital media contents such as photos, music and video, from personal devices such as a mobile device or a Personal Computer (PC). There is a need in the art for such middleware to better integrate with personal devices.

SUMMARY OF THE INVENTION

Accordingly, the present invention has been made to address one or more of the problems occurring in the prior art, and embodiments of the present invention provide an image display apparatus, a camera and a control method of the same, which photographs various images in a natural manner, enables a user to easily generate a photographing signal, and easily edits an image photographed by a plurality of cameras.

The foregoing and/or other aspects may be achieved by providing an image display apparatus including a display unit, a user input receiver which receives a user's input; a communication unit which communicates with at least one camera through a network, and a controller which displays on the display unit an image input by the camera, and transmits a photographing signal to the camera according to the user's input.

The foregoing and/or other aspects may be achieved by providing a camera including a photographing unit which generates a live view, a communication unit which communicates with an external image display apparatus through a network, and a controller which transmits a generated image to the image display apparatus, and photographs the live view according to a photographing signal received from the image display apparatus.

The foregoing and/or other aspects may be achieved by providing a control method of an image display apparatus which includes a display unit and communicates with at least one camera through a network, the control method including displaying on the display unit an image input from the camera; receiving a user's input, and transmitting a photographing signal to the camera according to the user's input.

The present invention further provides a control method of a camera, which communicates with an external image display apparatus through a network, including transmitting to the image display apparatus a live view before photographing, photographing the live view according to a photographing signal that is received from the image display apparatus, and storing an image that is received from the image display apparatus.

BRIEF DESCRIPTION OF THE DRAWINGS

The above and/or other aspects of the present invention will become apparent and more readily appreciated from the following description of the embodiments, taken in conjunction with the accompanying drawings, in which.

DETAILED DESCRIPTION OF EMBODIMENTS OF THE INVENTION

Hereinafter, various embodiments of the present invention will be described with reference to the accompanying drawings. In the following description, the same elements will be designated by the same reference numerals although they are shown in different drawings. Further, in the following description of the present invention, a detailed description of known functions and configurations incorporated herein will be omitted for the sake of clarity and conciseness.

Figure 1:
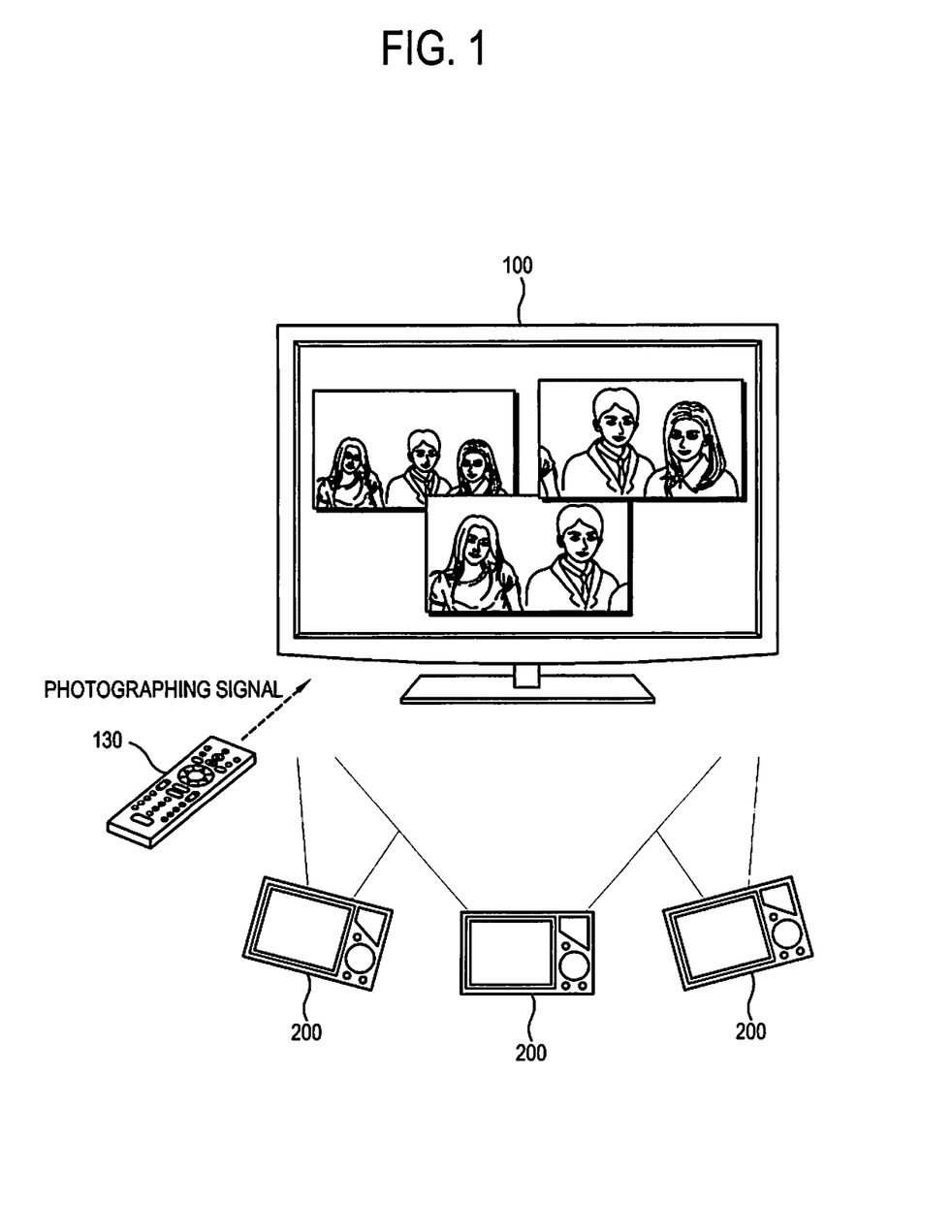
FIG. 1 illustrates an image display apparatus and a camera according to an embodiment of the present invention.
Figure 2:
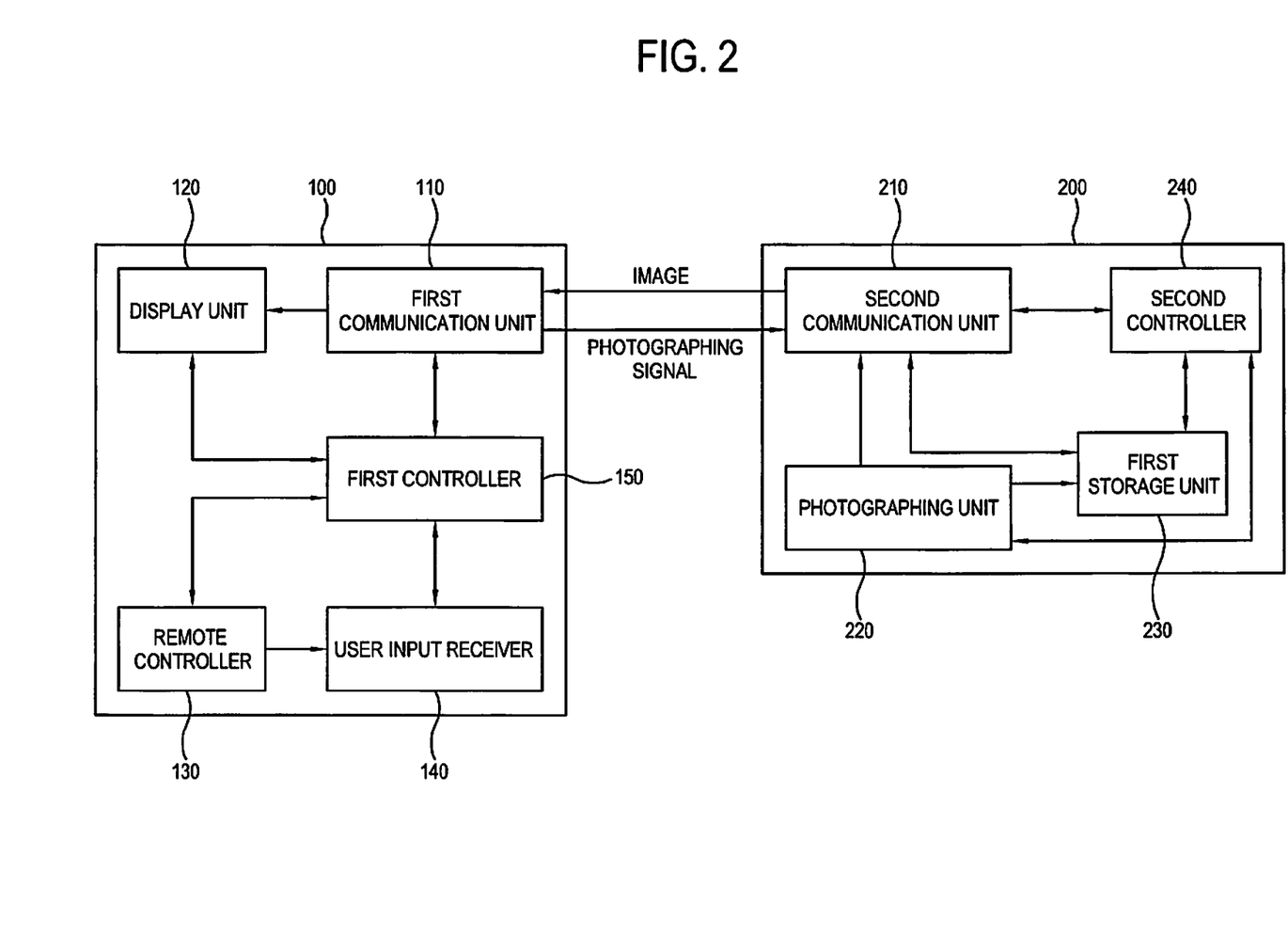
FIG. 2 is a control block diagram of the image display apparatus and the camera in FIG. 1.

FIG. 1 illustrates an image display apparatus and a camera according to an embodiment of the present invention. FIG. 2 is a control block diagram of the image display apparatus and the camera in FIG. 1.

As shown therein, the display system includes an image display apparatus 100 connected to a plurality of cameras 200, and may be provided in a limited space such as a school, home or event hall. The display apparatus 100 displays an image transmitted by the cameras 200, and provides a photographed image to users. A user may transmit a photographing signal, i.e., a shutter signal to the cameras 200 while viewing an image displayed on the image display apparatus 100 instead of manipulating the camera 200 to take a photograph.

An image is photographed and stored according to a photographing signal. The image display apparatus 100 may include a large display apparatus such as a television, a monitor, a Large Format Display (LFD), and a Table Top Display (TPD), which can be installed in a public place.

The TPD is an image display apparatus such as a screen that is installed on various types of tables. The TPD provides an interface through which at least one user may multi-touch the TPD by hand or a pointer while viewing an image processing result of an image processing apparatus such as a computer. This supports multi users and multi-touch to conduct a cooperative task. The multi touch includes an electric capacity type using a variation of electrical capacity, or a visual type using a camera optical device or heat sensor.

As illustrated in FIG. 2, the image display apparatus 100 includes a first communication unit 110, a display unit 120, a remote controller 130, a user input receiver 140 and a first controller 150 controlling the foregoing elements. The cameras 200 include a second communication unit 210, a photographing unit 220, a first storage unit 230 and a second controller 240.

The first communication unit 110 communicates with the plurality of cameras 200, i.e., the second communication unit 210 through a network. The first and second communication units 110 and 210 may include a communication module corresponding to various communication methods such as Bluetooth®, Wi-Fi, Zigbee®, Infrared (IR) communication, Radio Frequency (RF) communication and other wired communication.

Middleware supports a home networking to share digital contents such as music, photos, and video stored in electronic devices including home computer, home appliances and mobile terminals. Middleware includes Universal Plug and Play (UPnP), Home Audio Video Interoperability (HaVi), Jini, Video Electronics Standards Association (VESA), and Digital Living Network Alliance (DLNA). The image display apparatus 100 and the cameras 200 according to the first embodiment may communicate according to the DLNA established on the basis of the open standard, e.g. industrial standard such as HyperText Transfer Protocol (HTTP), UPnP, and Wi-Fi.

The DLNA focuses on sharing all contents provided by devices such as TV, VCR, digital cameras and audio systems, and supports a user to acquire, transmit and manage a number of digital media contents (e.g., photos, music and video) from personal devices such as a mobile device and a PC. The first and second communication units 110 and 210 may transmit and receive images, UI information and various control signals through a networking based on the DLNA.

The display unit 120 displays thereon a live view and a photographed image transmitted by the cameras 200. The live view used herein indicates an image prior to being photographed among images transmitted by the cameras 200. The photographed image indicates an image recorded according to a shutter operation of the cameras 200 corresponding to a user's photographing signal. Typically, both the live view and photographed image are photographed by the cameras 200 and transmitted to the image display apparatus 100, but will be separately described herein for purposes of convenience.

The display unit 120 may include a Liquid Crystal Display (LCD) panel including a liquid crystal layer, an Organic Light Emitting Display (OLED) panel including an organic light emitting layer or a Plasma Display Panel (PDP). The display unit 120 may include a panel driver to drive the display panel. The cameras 200 may include a display unit (not shown) to display thereon a photographed image.

The remote controller 130 corresponds to a UI for a user's input. A user inputs a photographing signal to be transmitted to the cameras 200 through the remote controller 130. The remote controller 130 may include a direction button, a number button and a selection button, and a wheel input unit or a touch pad. A user transmits a photographing signal to the cameras 200 through the image display apparatus 100 instead of pushing a button to activate a shutter of the cameras 200.

A user may manipulate a live view displayed on the display unit 120 by using the remote controller 130. For example, a user may zoom in or zoom out an image by using a button transmitting a control signal to increase or decrease volume or channel button. Also, the live view that is transmitted by the plurality of cameras 200 may be sequentially displayed in the manner of a slide show or displayed as plurality of screens on the display unit 120 as in FIG. 1.

The remote controller 130 may typically include a control device used to control the image display apparatus 100 or an independent device to transmit a control signal (e.g., IR signal) to control external devices such as a mobile phone. An interface that is used for a user's input may include a button or a touch panel installed in the image display apparatus 100 instead of the remote controller 130.

The user input receiver 140 receives a photographing signal from the remote controller 130 and outputs the photographing signal to the first communication unit 110. The photographing signal is transmitted to the cameras 200 through the second communication unit 210. The user input receiver 140 may include an IR receiver or an RF receiver.

The first controller 150 displays on the display unit 120 an image input by the cameras 200, and controls the first communication unit 110 to transmit a photographing signal to the cameras 200 according to a user's input. The photographing signal for photographing an image is transmitted according to the communication standard for the image display apparatus 100 and the camera 200, i.e., the DLNA communication according to the first embodiment herein.

The first controller 150 may control a live view before photographing an image displayed on the display unit 120 according to a user's input through the remote controller 130. The first controller 150 may receive UI information (to be described below), and display various GUI on the display unit 120 based on the foregoing UI information.

The photographing unit 220 photographs a user to transmit the live view and the photographed image to the image display apparatus 100. The photographing unit 220 includes an optical part including a lens, and an image processor detecting an incident light and converting the light into an electric signal to generate an image. The photographing unit 220 further includes a shutter to record a live view according to a photographing signal, and may include other known elements for taking a photograph. As described above, an image that is provided to a user by the photographing unit 220 may be divided into the live view and the photographed image before and after the output of the photographing signal.

The second controller 240 transmits a generated image to the image display apparatus 100, and controls the photographing unit 220 to photograph an image according to a photographing signal received from the image display apparatus 100. The second controller 240 may transmit to the image display apparatus 100 UI information related to photographing the image. Hereinafter, photographing the image according to a control of the first and second controllers 150 and 240 through the GUI displayed on the image display apparatus 100 will be described.

The first storage unit 230 stores therein a photographed image that is photographed according to a photographing signal. The photographed image includes a still image and a moving image.

The first controller 150 may control the first communication unit 110 to transmit each photographed image photographed by at least one of the plurality of cameras 200 to the remaining cameras 200 which did not photograph the photographed image. That is, the first controller 150 may enable the photographed image to be shared between the cameras 200, thus fully using the photographed image.

Figure 3:
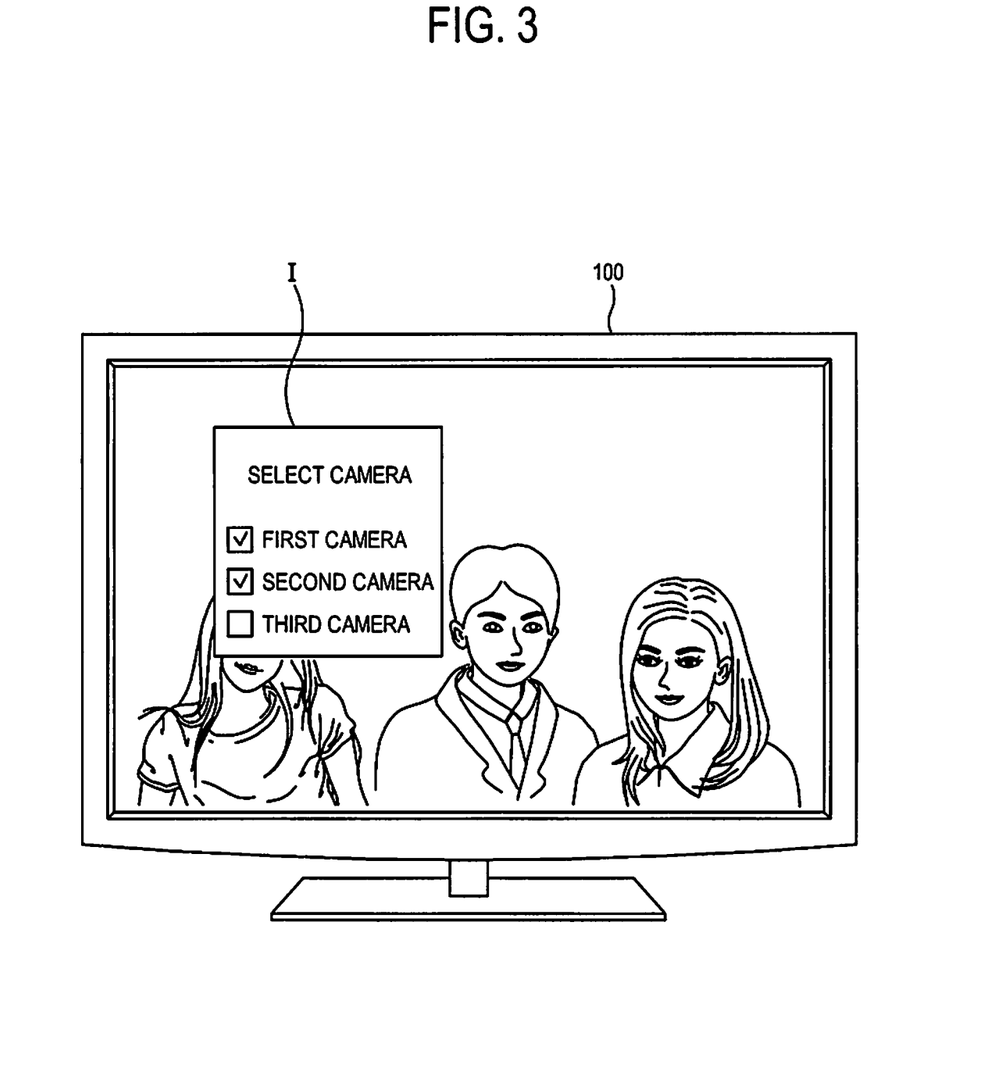
FIG. 3 illustrates a graphic user interface (GUI) for selecting at least one of the plurality of cameras in FIG. 1.

FIG. 3 illustrates a GUI that is provided to select at least one of the plurality of cameras 200. Referring to FIGS. 2 and 3, the image display apparatus 100 determines which camera 200 is connectable currently through the first communication unit 110, or displays on the display unit 120 a GUI I upon receiving a request signal for the connection from the cameras 200. A user may connect the plurality of cameras 200 and the image display apparatus 100 after installing or fixing the cameras 200 at a proper location, or may select at least one of the plurality of cameras 200 to transmit the photographing signal. As shown therein, if a user selects the camera 200, a selection mark √ is displayed. The cameras 200 may be identified by their own authentication number, by manufacturers, or by an installation location.

Figure 4:
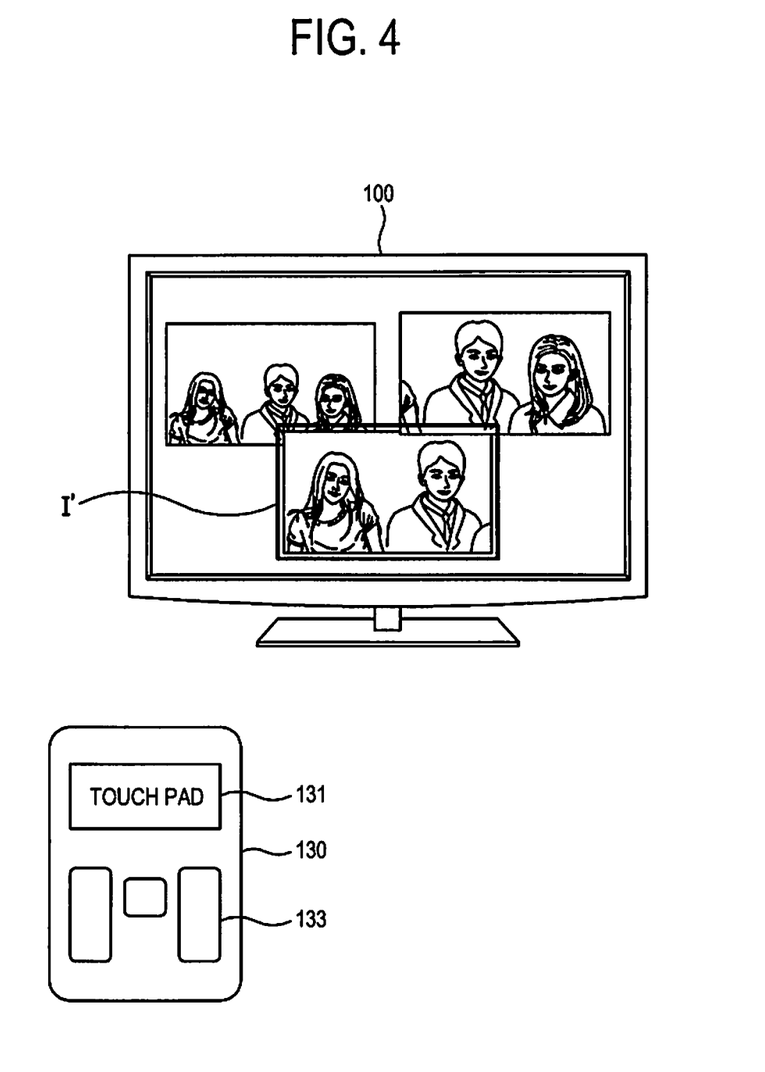
FIG. 4 illustrates a highlight identifier for selecting at least one of images displayed on the image display apparatus in FIG. 1.

FIG. 4 illustrates a highlight identifier that is provided to select at least one of images displayed on the image display apparatus 100 in FIG. 1. As shown therein, the display unit 120 displays thereon live views received from the plurality of cameras 200, and a user may select at least one of the live views by using the GUI displayed on the display unit 120 and the remote controller 130 falling under the user input unit.

A user may select the cameras 200 to take a photograph of an image by selecting the live view. The display unit 120 displays thereon a highlight identifier I' to select at least one of the plurality of live views. According to another embodiment, a pointer which moves between live views to select at least one live view may be displayed, or both the pointer and the highlight identifier I' may be displayed.

The remote controller 130 includes a touch-based sensor to move at least one of the pointer and the highlight identifier I' displayed on the display unit 120. As shown in FIG. 4, the remote controller 130 may include a touch panel 131 to detect a user's touch, and a plurality of buttons 133. A user may move, flick objects or pages by set unit, or click or tap the touch pad 131, double click or drag and drop objects on the touch pad 131. A user may select the live view by moving between the live views with the touching, flicking or tapping function.

Figure 5:
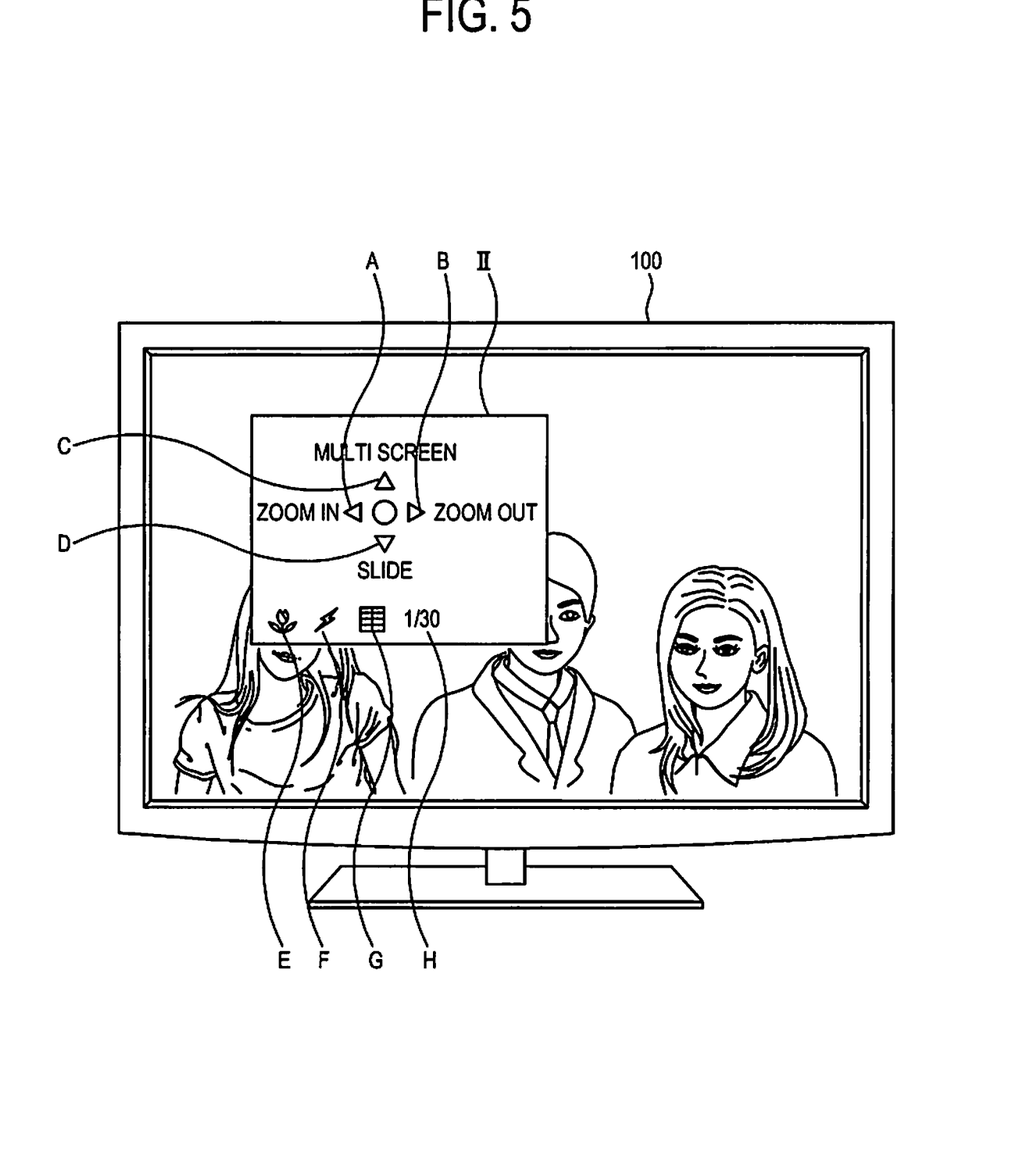
FIG. 5 illustrates a manipulation menu that is displayed on the image display apparatus in FIG. 1.

A user may also select the live view through a direction key included in the buttons 133. FIG. 5 illustrates a manipulation menu that is displayed on the image display apparatus 100 in FIG. 1. A manipulation menu II is provided to manipulate live views displayed on the display unit 120 before photographing an image, and includes various items to manipulate the image before photographing. The manipulation menu II includes zoom-in and zoom-out items A and B to zoom in and out the live view, a multi screen item C which divides the display unit 120 into a plurality of screens and displays on the screens images transmitted from the plurality of cameras 200, and a slide item D which sequentially displays a plurality of live views on a single screen.

The manipulation menu II further includes a close-up item to photograph a close-up image E, a flash item F, a resolution adjustment item G, and an item H to adjust the speed of the shutter. If the live view displayed on the display unit 120 is changed by the manipulation menu II, the photographing is performed in the changed live view. A user may adjust a display state of the live view displayed on the display unit 120 and manipulate the cameras 200 to acquire the effect of adjusting the live view. If a desired live view is set, the photographing signal may be input through the remote controller 130.

Figure 6:
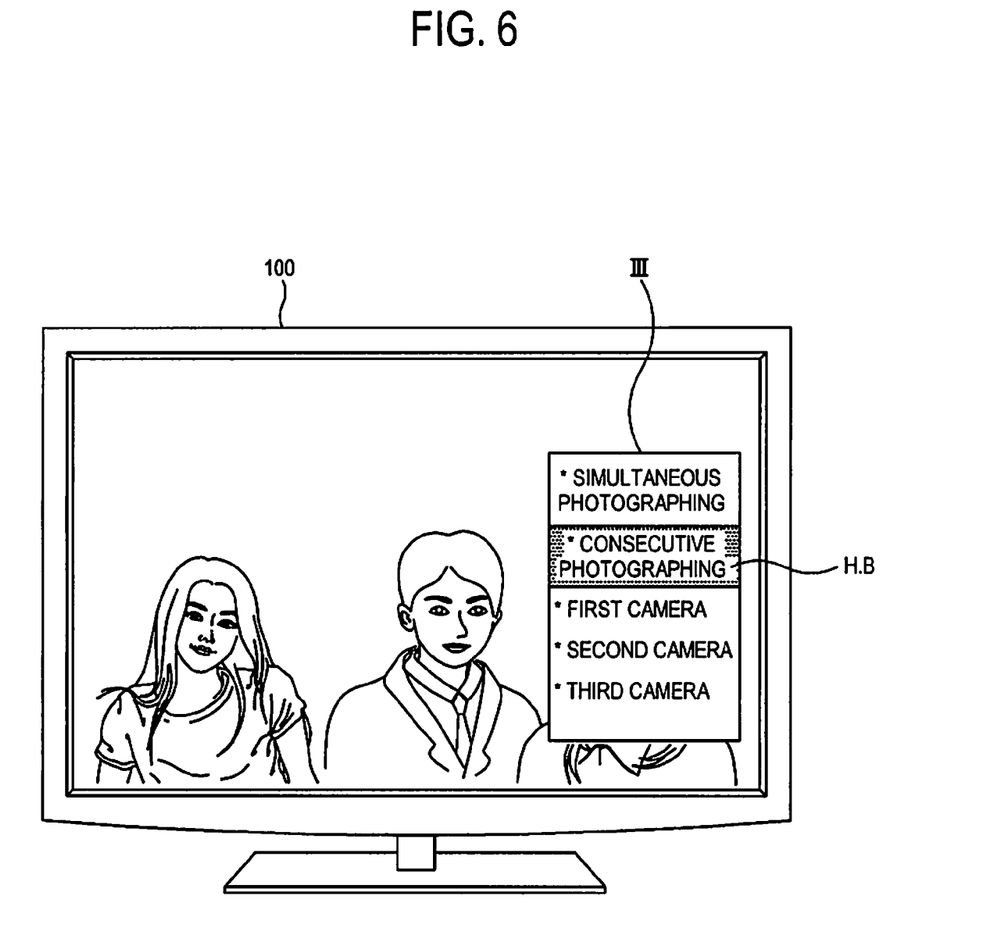
FIG. 6 illustrates a photographing menu that is displayed on the image display apparatus in FIG. 1.

FIG. 6 illustrates a photographing menu that is displayed in the image display apparatus 100 in FIG. 1. A photographing menu III includes a UI to take a photograph by the cameras 200, and includes other various adjustment items as shown therein. The adjustment items may include a simultaneous-photographing item to simultaneously transmit a photographing signal to the plurality of cameras 200, a consecutive photographing item to consecutively transmit the photographing signal to the plurality of cameras 200, and an item to transmit the photographing signal only to a particular camera 200.

According to a user's manipulation, highlight bars HB may move between the foregoing items. If the item in which the highlight bars HB are located is selected, the photographing signal may be transmitted to the concerned camera 200. The first controller 150 transmits to the camera 200 the photographing signal corresponding to the selected photographing menu III.

Upon receiving the photographing signal, the photographing unit 220 photographs a live view displayed on the display unit 120, and stores in the first storage unit 230 the photographed still image or moving image. If the photographing image is stored, meta information of the image is generated and stored together with the image. The meta information may include a EXchangeable Image File format (EXIF). The EXIF is an image file format stored in an image file of a digital camera, and includes such information as image data, manufacturer of the camera, a camera model, an image editor, the date when images are adjusted and photographed, image size, exposure time and focal length. The first storage unit 230 may group and store the photographed images by using the meta information, or generate folders by the grouped photographed image. Otherwise, the first storage unit 230 may generate and store a thumbnail for the photographed image. The image display apparatus 100 may retrieve the folder or thumbnail of the photographed image stored in the cameras 200, and load the retrieved photographed image. The photographing menu III is GUI that may be omitted. A user may photograph an image according to a photographing type set as a default instead of through the photographing menu III.

The photographed image is displayed on the image display apparatus 100, and may be streamed to the image display apparatus 100 through the DLNA-based networking, or downloaded as a file to the image display apparatus 100 from the cameras 200.

The second communication unit 210 may receive from the image display apparatus 100 the image photographed by another camera 200. Such photographed image is stored in the first storage unit 230. That is, each camera 200 may easily share images photographed by other cameras 200 without using an additional interface such as a computer. Accordingly, a user's convenience is enhanced, and the photographed image may be further utilized.

Figure 7:
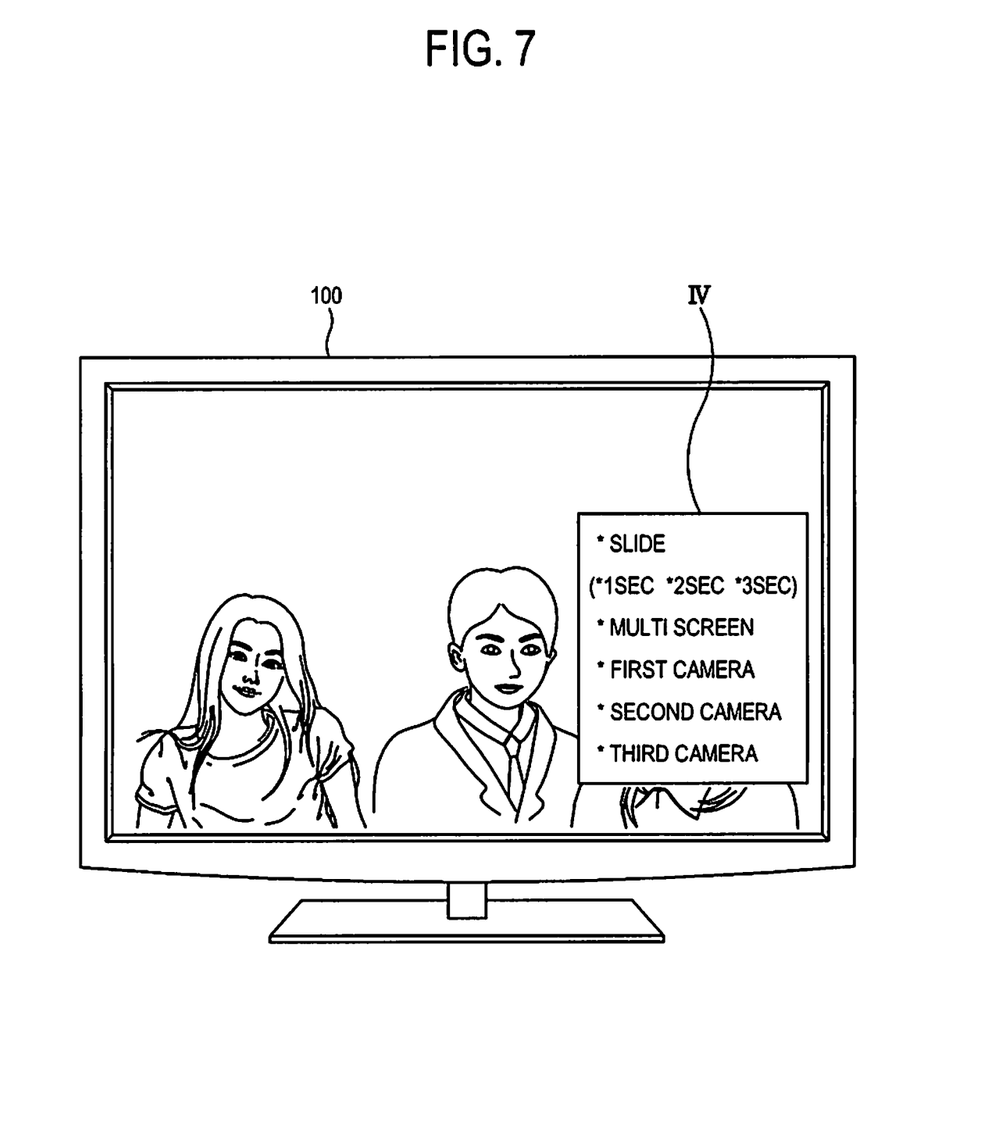
FIG. 7 illustrates a play menu that is displayed on the image display apparatus in FIG. 1.

FIG. 7 illustrates a play menu that is displayed on the image display apparatus 100 in FIG. 1.

Referring to FIGS. 2 and 7, the first controller 150 may display on the display unit 120 a play menu IV to play an image that is photographed according to a photographing signal. The photographed image to be played may be downloaded from the cameras 200 to the image display apparatus 100 to be played by the image display apparatus 100. Otherwise, the image display apparatus 100 may simply load a photographed image from the cameras 200 or other external devices and display such image thereon.

For example, a moving image may be streamed from the cameras 200 or other external devices and displayed in the image display apparatus 100. The image display apparatus 100 may load the photographed image stored in the cameras 200 by using a script including location information of the stored photographed image, data of the photographed image and image information. Upon receiving a play signal, the image display apparatus 100 may load the photographed image by using the location information or link information of the photographed image that is stored in advance or received from the cameras 200.

The play menu IV may include items similar to the photographing menu III. As shown therein, the play menu IV includes a slide item to sequentially play the photographed image, a multi-screen item to simultaneously display images photographed by the plurality of cameras 200, and an item to display images photographed by each of the cameras 200. When a slide item is used, the play menu IV further includes a playtime item to select time for which the photographed image moves.

When the photographing is completed, the photographed image may be shared by communication between the cameras 200. If a user plays the photographed image, each of the cameras 200 may individually transmit the photographed image to the image display apparatus 100 or one of the cameras 200 which share the photographed image may transmit the photographed image to the image display apparatus 100.

Figure 8:
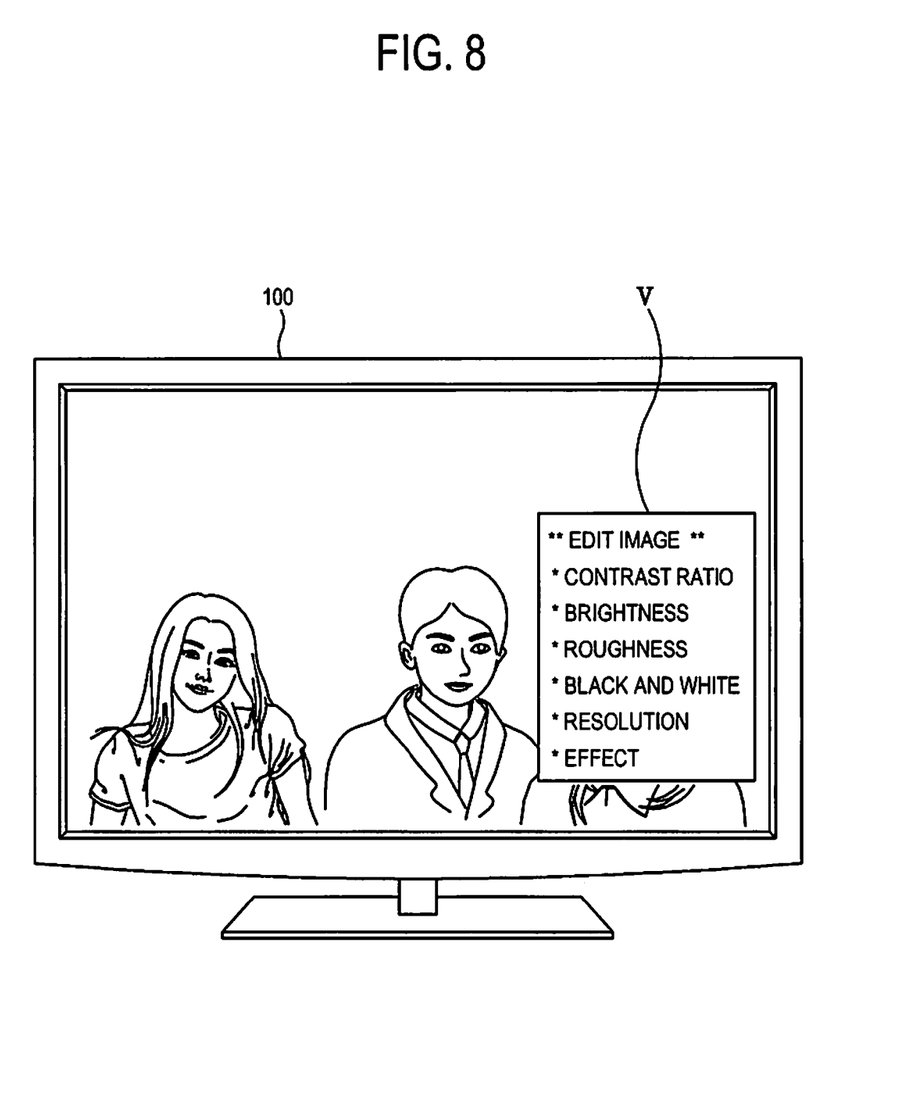
FIG. 8 illustrates an editorial menu that is displayed on the image display apparatus in FIG. 1.

FIG. 8 illustrates an editorial menu that is displayed on the image display apparatus 100 in FIG. 1.

The editorial menu V is a user interface that is provided to edit the photographed image. A user may edit the photographed image by using the image display apparatus 100 rather than the cameras 200. Editing the photographed image includes deleting images, and adjusting contrast ratio, brightness, roughness, black and white, resolution and effect of images. A user may add frames or texts to the photographed image. Each item may include specific sub items, and may include a cursor for a user to conveniently edit the photographed image. According to a user's editing, the photographed image that is recorded in the cameras 200 may be changed.

The foregoing GUIs may be generated by executing an application of the image display apparatus 100 or may be generated based on UI information transmitted by the cameras 200. If the communication between the image display apparatus 100 and the cameras 200 is made by the DLNA, both devices may transmit and receive remote UIs, and UI information may be transmitted as a script. Then, a scripter that is used to photograph and edit images may be transmitted from the cameras 200 to the image display apparatus 100, and accordingly, the image display apparatus 100 may generate a GUI based on the received scripter. If a user inputs various signal by referring to the GUI, such signals are transmitted to the cameras 200 to control photographing and editing of the image.

Figure 9:
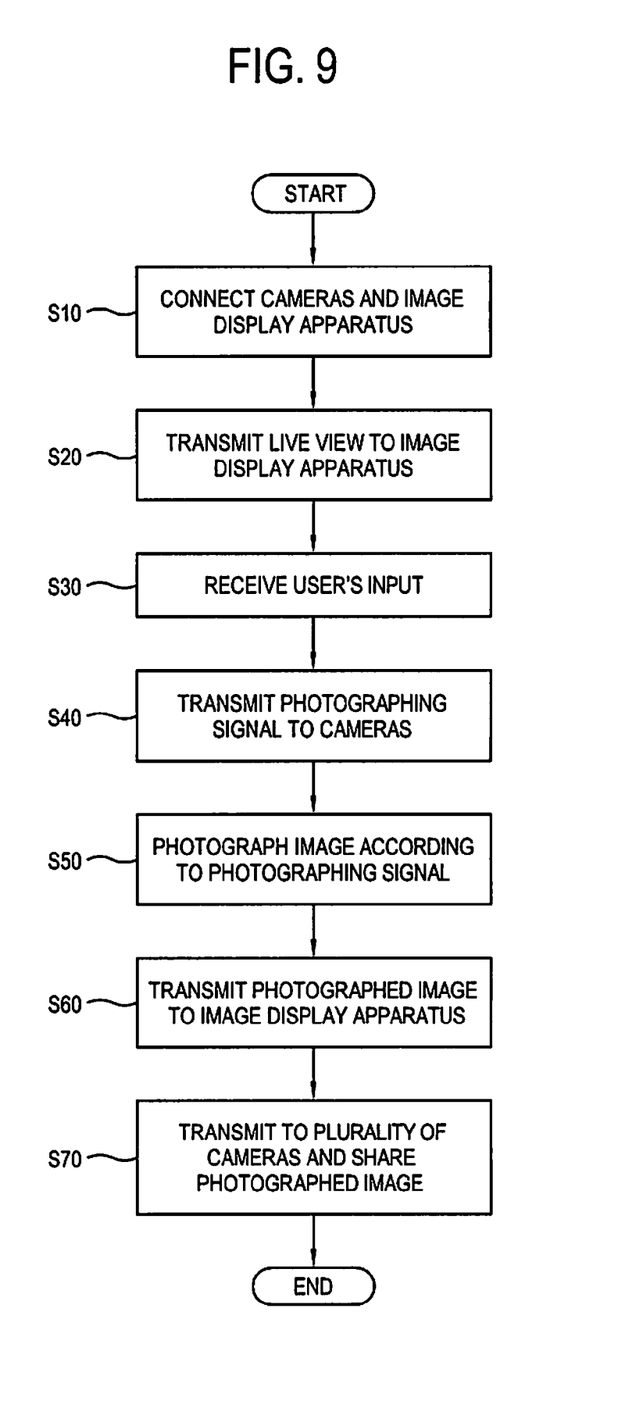
FIG. 9 is a control flowchart of a control method of the image display apparatus and the camera in FIG. 1.

FIG. 9 is a control flowchart of a control method of the image display apparatus 100 and the cameras 200 in FIG. 1. Referring to FIG. 9, an image control method of the display system according to an embodiment of the present invention will be described as follows.

In step S10, the image display apparatus 100 is connected to at least one camera 200 to communicate with each other. A user may select at least one of the plurality of connected cameras 200 to photograph an image.

The cameras 200 transmit to the image display apparatus 100 the live view before photographing in step S20, and the image display apparatus 100 displays on the display unit 120 the live view input from the cameras 200.

The image display apparatus 100 receives the photographing signal to photograph an image through the UI device such as the remote controller 130 in step S30, and transmits the photographing signal to the cameras 200 in step S40. A user may manipulate the live view before photographing by using the remote controller 130 or the manipulation menu II.

The cameras 200 photograph the live view according to the received photographing signal in step S50, and transmit to the image display apparatus 100 the photographed image in step S60. The display unit 120 may display thereon the GUI such as the photographing menu II, the play menu IV to play the photographed image, and the editorial menu V to edit the photographed image. Such GUI may be generated and executed by software stored in the image display apparatus 100, or generated on the basis of the UI information transmitted by the cameras 200.

The image display apparatus 100 transmits the photographed image to other cameras 200 of the plurality of cameras 200 to share the photographed image with the cameras 200 in step S70.

The display system according to an embodiment includes the plurality of cameras 200, but is not limited thereto. Alternatively, a single camera 200 may be installed in an appropriate location for photographing an image, and the image display apparatus 100 may display the live view and photographed image transmitted by the single camera 200 and select, photograph, store and edit such image.

Figure 10:
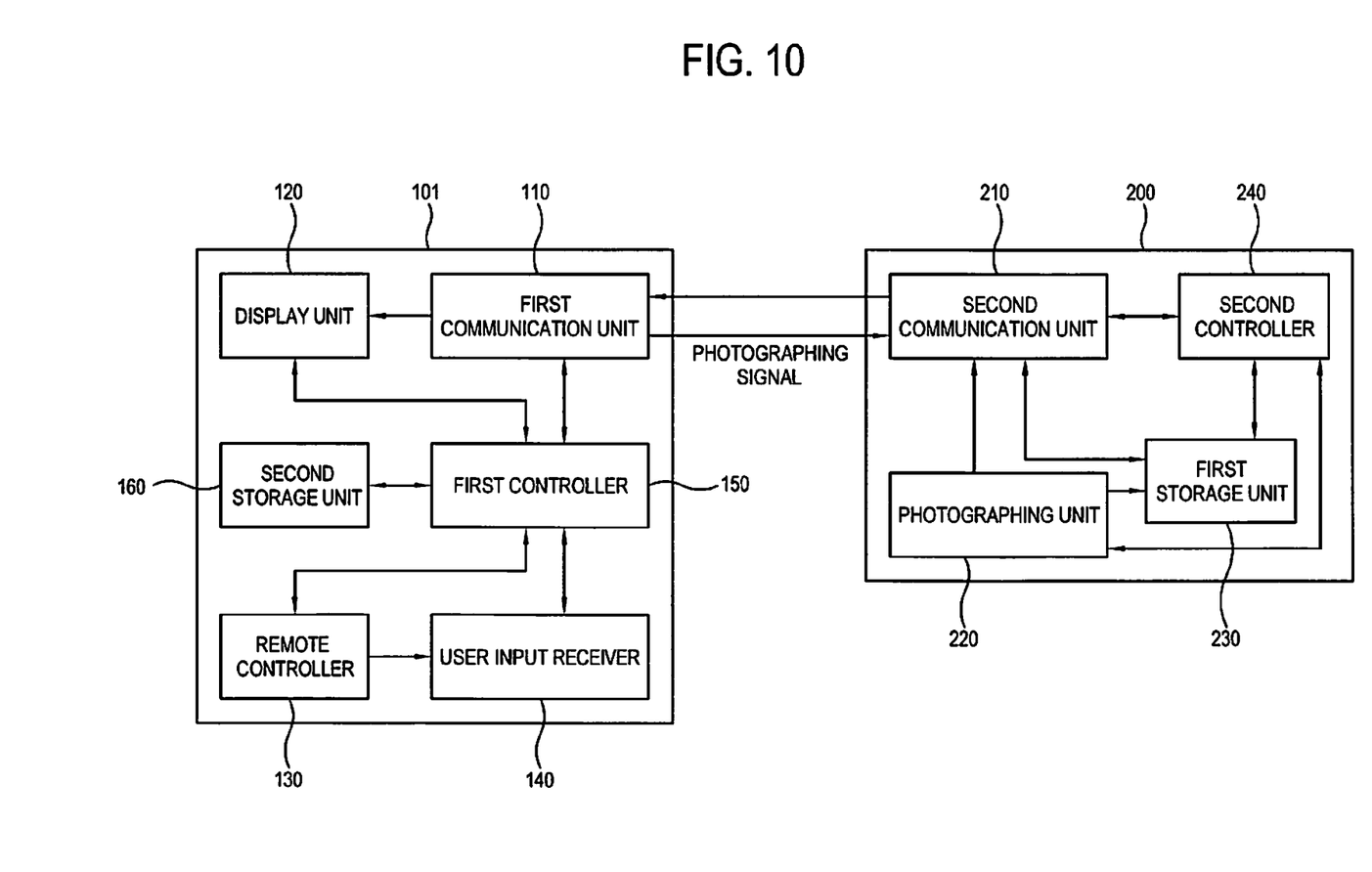
FIG. 10 illustrates an image display apparatus and a camera according to an embodiment of the present invention.

FIG. 10 illustrates an image display apparatus 101 and a camera 200 according to an embodiment of the present invention. As shown therein, an image display apparatus 101 further includes a second storage unit 160 to store therein a photographed image. The image display apparatus 101 not only displays an image transmitted by the camera 200 and transmits a user's input, but also stores therein the photographed image to thereby improve utilization of the photographed image. If the photographed image is stored in the second storage unit 160, the image display apparatus 101 may perform various editorial functions by using software such as Photoshop, and play such photographed image without the camera 200 to thereby improve user accessibility to the photographed image.

Figure 11:
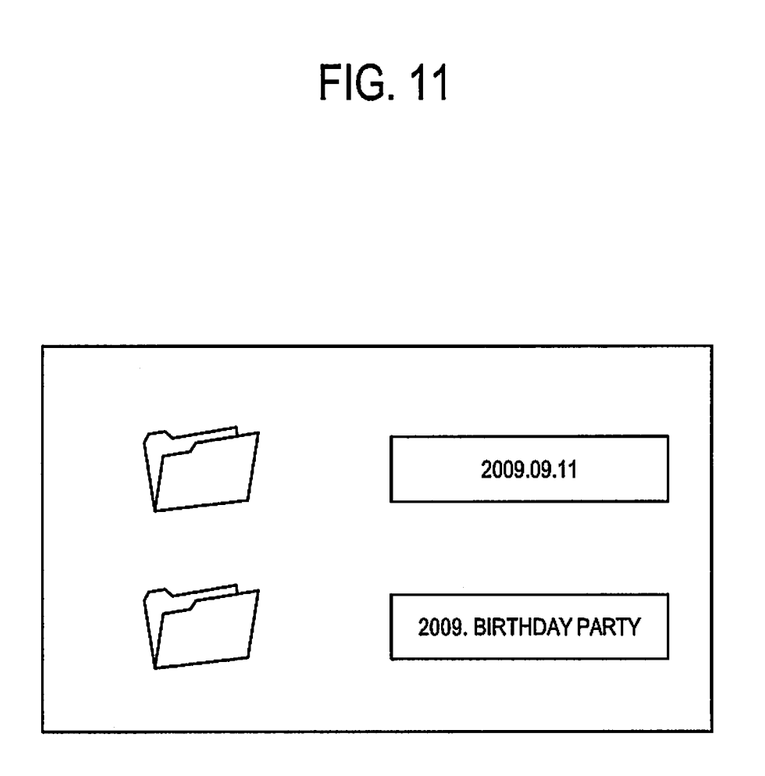
FIG. 11 illustrates an image folder that is stored in the image display apparatus in FIG. 10.

FIG. 11 illustrates an image folder that is stored in the image display apparatus 101 in FIG. 10. As shown therein, a first controller 150 may group the photographed image by using meta information of the photographed image, and control the second storage unit 160 to store therein the grouped photographed image by a folder. The folder may be generated by the date when the image is photographed, by particular time, by still image or moving image, by camera or by manufacturer of camera. The folder name may be generated by a user or may be generated automatically by using the referred meta information.

The folder may be generated by the camera 200 instead of the image display apparatus 101. If the photographing is finished, a play signal of the photographed image is received or the image display apparatus 101 requests, the camera 200 may transmit to the image display apparatus 100 a list or folder information of the photographed image or location information of the photographed image.

The present invention connects one or more cameras 200 and the image display apparatus 100, and enables a user to easily recognize a photographed image and to photograph an image through a remote controller 130 familiar to a user's hand. Various UI information and control signals may be transmitted or received by the communication between the image display apparatus 100 and the cameras 200, and a user may conveniently and easily photograph, play and edit images.

As described above, an image display apparatus, a camera and a control method of the same according to the present invention photographs various image in a natural manner, enables a user to easily generate a photographing signal, and easily edits images photographed by a plurality of cameras.

Although certain embodiments have been shown and described above, it will be appreciated by those skilled in the art that changes may be made in these embodiments without departing from the principles and spirit of the invention, the scope of which is defined in the appended claims and their equivalents.

What is claimed is:

1. An image display apparatus comprising:
a display unit;
a user input receiver for receiving a user input, which causes at least one of a plurality of cameras to capture an image;
a communication unit for communicating with the plurality of cameras through a network; and
a controller for displaying on the display unit a plurality of live views received from the plurality of cameras so that the user can view the plurality of live views through the display unit, and transmitting a photographing signal for obtaining a photographed image to at least one of the plurality of cameras which is selected in response to the user input during displaying of the live views,
wherein each of the live views indicates an image prior to being photographed, and the photographed image indicates an image recorded according to a shutter operation of the selected at least one camera by the photographing signal, and
wherein the plurality of live views are sequentially displayed in a slide show or displayed as a plurality of screens on the display unit, and the display unit further displays a plurality of items selectable by the user input while displaying the plurality of live views before transmitting the photographing signal, the plurality of items comprising a photographing menu to generate the photographing signal.

2. The image display apparatus according to claim 1, wherein the controller controls the communication unit to transmit the photographed image photographed by the selected at least one of the plurality of cameras to remaining cameras among the plurality of cameras that did not photograph the image.

3. The image display apparatus according to claim 1, wherein the controller manipulates the live view that is displayed on the display unit according to the user input before capturing.

4. The image display apparatus according to claim 2, wherein the controller displays on the display unit a manipulation menu to manipulate the live view.

5. The image display apparatus according to claim 1, wherein the controller transmits the photographing signal to the selected at least one of the plurality of cameras through the communication unit according to a user selection of the photographing menu.

6. The image display apparatus according to claim 1, wherein the controller displays on the display unit a play menu to play the photographed image according to the photographing signal.

7. The image display apparatus according to claim 1, wherein the controller displays on the display unit an editorial menu to edit the photographed image that is photographed by the at least one camera according to the photographing signal.

8. The image display apparatus according to claim 1, wherein the controller displays on the display unit a plurality of images from the plurality of cameras, and transmits the photographing signal to the at least one of the plurality of cameras selected according to the user input.

9. The image display apparatus according to claim 8, wherein the display unit displays thereon at least one of a pointer and a highlight identifier to select at least one of the plurality of images, and the controller moves at least one of the pointer and the highlight identifier according to the user input.

10. The image display apparatus according to claim 1, wherein the controller receives user interface information relating to photographing an image from the plurality of cameras based on a digital living network alliance networking, and displays on the display unit a graphic user interface which is generated on the basis of the user interface information.

11. The image display apparatus according to claim 1, further comprising a remote controller for receiving the user input, wherein the remote controller comprises a touch-based sensor for moving at least one of the pointer and the highlight identifier displayed on the display unit.

12. The image display apparatus according to claim 1, further comprising a storage unit, wherein the controller stores in the storage unit the photographed image that is photographed by the at least one camera according to the capturing command.

13. The image display apparatus according to claim 12, wherein the controller groups and stores the photographed image based on meta information of the photographed image.

14. A camera comprising:
a photographing unit for generating a live view;
a communication unit for transmitting the live view to an external image display apparatus through a network so that a user can view a plurality of live views through the external image display apparatus; and
a controller for receiving a photographing signal for obtaining a photographed image from the external image display apparatus, and photographing the live view according to the photographing signal received from the external image display apparatus, the external image display apparatus transmitting the photographing signal to at least one of the plurality of cameras selected by the user, wherein each of the live views indicates an image prior to being photographed, and the photographed image indicates an image recorded according to a shutter operation of the selected at least one camera by the photographing signal, and wherein the plurality of live views are sequentially displayed in a slide show or displayed as a plurality of screens on the external image display apparatus, and the external image display apparatus displays a plurality of items selectable by a user input while displaying the plurality of live views before transmitting the photographing signal, the plurality of items comprising a photographing menu to generate the photographing signal.

15. The camera according to claim 14, further comprising a storage unit for storing therein the photographed image that is photographed according to the photographing signal, wherein the controller transmits the photographed image to the external image display apparatus or transmits image information of the photographed image to the external image display apparatus, upon receiving a signal to display the photographed image from the external image display apparatus.

16. The camera according to claim 15, wherein the controller controls the storage unit to store therein an image received from the external image display apparatus through the communication unit.

17. The camera according to claim 14, wherein the controller transmits to the external image display apparatus user interface information relating to photographing an image based on a digital living network alliance networking.

18. A control method of an image display apparatus including a display unit, which communicates with a plurality of cameras through a network, the control method comprising:
displaying on the display unit a plurality of live views received from the plurality of cameras so that the user can view the live view through the display unit;
receiving a user input; and
transmitting a photographing signal for obtaining a photographed image to at least one of the plurality of cameras which is selected in response to the user input during displaying of the live view,
wherein each of the live views indicates an image prior to being photographed, and the photographed image indicates an image recorded according to a shutter operation of the selected at least one camera by the photographing signal, and
wherein the plurality of live views are sequentially displayed in a slide show or displayed as a plurality of screens on the display unit, and the display unit displays a plurality of items selectable by the user input while displaying the plurality of live views before transmitting the photographing signal, the plurality of items comprising a photographing menu to generate the photographing signal.

19. The control method according to claim 18, further comprising:
transmitting the photographing signal to the selected at least one of the plurality of cameras; and
transmitting each photographed image to remaining cameras among the plurality of cameras that did not photograph the photographed image.

20. The control method according to claim 18, further comprising manipulating a live view that is displayed on the display unit according to the user input before capturing.

21. The control method according to claim 20, further comprising displaying on the display unit a manipulation menu to manipulate the live view.

22. The control method according to claim 18, further comprising
transmitting the photographing signal to the at least one of the plurality of cameras according to a user selection of the photographing menu.

23. The control method according to claim 18, further comprising displaying on the display unit a play menu to play an image that is photographed according to the photographing signal.

24. The control method according to claim 18, further comprising displaying on the display unit an editorial menu to edit an image that is photographed by the at least one camera according to the capturing command.

25. The control method according to claim 18, further comprising:
displaying on the display unit a plurality of images that are input by the plurality of cameras; and
transmitting the photographing signal to at least one selected camera from among the plurality of cameras according to the user input.

26. The control method according to claim 25, further comprising:
displaying at least one of a pointer and a highlight identifier to select at least one of the plurality of images; and
moving at least one of the pointer and the highlight identifier according to the user input.

27. The control method according to claim 18, further comprising:
receiving user interface information relating to photographing an image from the plurality of cameras based on a digital living network alliance networking; and
displaying on the display unit a graphic user interface generated on the basis of the user interface information.

28. The control method according to claim 18, further comprising storing an image that is photographed by the at least one camera according to the photographing signal.

29. A control method of a plurality of cameras that communicate with an external image display apparatus through a network, the control method comprising:
transmitting a plurality of live views from the plurality of cameras to the external image display apparatus so that a user can view the plurality of live views through the external image display apparatus;
receiving a photographing signal for obtaining a photographed image from the external image display apparatus; and
photographing the live view according to a photographing signal received from the image display apparatus, the external image display apparatus transmitting the photographing signal to at least one of the plurality of cameras selected by a user,
wherein each of the live view indicates an image prior to being photographed, and the photographed image indicates an image recorded according to a shutter operation of the selected at least camera by the photographing signal, and
wherein the plurality of live views are sequentially displayed in a slide show or displayed as a plurality of screens on the image display apparatus, and the image display apparatus displays a plurality of items selectable by a user input while displaying the plurality of live views before transmitting the photographing signal, the plurality of items comprising a photographing menu to generate the photographing signal.

30. The control method according to claim 29, further comprising storing an image that is received from the image display apparatus.

31. The control method according to claim 29, further comprising storing an image that is photographed according to the photographing signal; and transmitting, to the image display apparatus, the photographed image, upon receiving a signal from the image display apparatus to display the photographed image.

32. The control method according to claim 29, further comprising storing an image that is photographed according to the photographing signal; and transmitting, to the image display apparatus, image information of the photographed image upon receiving a signal from the image display apparatus to display the photographed image.

33. The control method according to claim 29, further comprising transmitting to the image display apparatus user interface information relating to photographing the live view based on a digital living network alliance networking.

34. The image display apparatus according to claim 1, further comprising transmitting the photographing signal to the at least one camera related to the live view selected among the plurality of live views.

\* \* \* \* \*